US005424141A

United States Patent [19]

Croner

[11] Patent Number: 5,424,141

[45] Date of Patent: Jun. 13, 1995

[54] DESIGN TRANSFER PROCESS AND KIT

[76] Inventor: Marjorie Croner, 8690 Cobb Rd., Manassas, Va. 22111

[21] Appl. No.: 918,704

[22] Filed: Jul. 27, 1992

Related U.S. Application Data

[63] Continuation-in-part of Ser. No. 517,247, May 1, 1990, Pat. No. 5,133,819.

[51] Int. Cl.[6] .......... B32B 9/00

[52] U.S. Cl. .......... 428/195; 428/914; 428/913.3

[58] Field of Search .......... 428/913.3, 914

[56] References Cited

U.S. PATENT DOCUMENTS

| | | | |
|---|---|---|---|
| 2,631,947 | 6/1947 | Kline et al. | 428/63 |
| 3,607,526 | 9/1971 | Biegen | 156/235 |
| 3,985,602 | 10/1976 | Stuart | 156/235 |
| 4,235,657 | 11/1980 | Greenman et al. | 428/914 |
| 4,783,354 | 11/1988 | Fagan | 428/40 |

*Primary Examiner*—Patrick J. Ryan
*Assistant Examiner*—Kam F. Lee
*Attorney, Agent, or Firm*—Glenna Hendricks; Stephen Gates

[57] ABSTRACT

Processes for transfer of design and kite therefore are easily used to transfer images on objects, including fine materials such as silk. The recipient materials remain pliable. Kits containing components for use in the processes of the invention may be prepared for use with any transfer materials. Fabric that has been decorated by the processes of the invention can be sewed, washed, and dried without releasing the image transferred thereto.

10 Claims, 2 Drawing Sheets

DESIGN TRANSFER PROCESS AND KIT

This application is a continuation-in-part of U.S. Ser. No. 07/517,247 , filed May 1, 1990, which has been allowed, now U.S. Pat. No. 5,133,819.

FIELD OF THE INVENTION

This invention is related to the fields of design and design transfer. Processes for transfer of design and kits therefore are disclosed herein.

BACKGROUND OF THE INVENTION

A wide variety of transfer printing processes have been described in the prior art. U.S. Pat. Nos. 3,985,602 to Stuart and 4,685,984 to Powers both describe processes for transferring images from a paper sheet to another sheet. The processes may be used for paper to fabric transfer. Stuart describes use of a composite sheet which incorporates a paper carrier sheet with a transparent, thermoplastic sheet having an image retaining, pressure sensitive adhesive layer. A release layer on the adhesive permits a paper protective layer to be adhered until time to use the sheet. In use, the composite sheet is placed against a printed image on the paper, and the pressure sensitive adhesive holds the image while the original paper backing is dissolved away by water. A source of heat such as an iron is used to cause a melting of the thermoplastic layer whereby the plastic, with the adhesive and the image are bonded to the fabric.

Powers teaches another image transfer process for transferring images from paper to fabric, but utilizes a different transfer medium. The Powers process uses a water-impervious, heat-resistant plastic support layer which has a high release coating which supports a contact adhesive, a thermoplastic layer, and a protective layer. After removal of the protective layer, a paper bearing the image to be transferred is placed against the adhesive layer and becomes adherent thereto. The composite obtained thereby is then placed in water to weaken and disintegrate the paper carrier, leaving the image adhered to the plastic sheet. The plastic carrier sheet bearing the image is then applied to the fabric and heat and pressure is applied to fuse the thermoplastic and bound the image to the fabric. The plastic support layer is then removed. The process depends heavily on the qualities of the release coatings. Both the Stuart and Power processes result in a fabric having an image with a plastic layer adherent thereto.

Biegen, in U.S. Pat. No. 3,6607,526, teaches a transfer technique using a contact or pressure sensitive adhesive on a release sheet to pick up an image from a paper sheet. Thereafter, the paper sheet is dissolved in water, leaving the image adhered to the adhesive on the release sheet. The paper that originally held the image is then removed by soaking until the paper has softened so that the paper can be rubbed off. The adhesive is then non-tacky because parts of the paper are adherent to the adhesive. The process differs from the instant process in that the paper must be rubbed from the adhesive, which retains some of the paper and is then non-tacky. The image is then transferred to the fabric. However, the fabric then retains a tacky feel.

All of the prior art techniques described are deficient because the final product retains a fairly heavy layer of the substrate that held the image to the transfer sheet. Fabrics treated by the prior art methods had a stiff, unmanageable quality. The methods described in the first two patents leave a plastic coating over the image. While such a coating may be appropriate for some applications, the effect is undesirable in many instances. The further processing of the product is difficult when the surface with the image has too heavy a layer of transfer material. Furthermore, the resulting image is not appropriate for more delicate artistic applications. Hence, the decorative possibilities with the prior art methods are limited to sports wear and prints wherein no further sewing on the decorated surface is required.

Prior art techniques were sold under the trademarks "Transfer Magic" and "Fabulon". The commercially available products suggest use of the transfer media with printed material or with photocopies of photographs. Hence, it was at least theoretically possible to produce a color image transfer using a color photocopy. In practice, however, such color photocopies do not provide flexibility of coloration, and even with the improved copiers, the applications are limited.

DEFINITION OF TERMS

"Acceptor surface" is the surface that is the final recipient of the image that is transferred.

"Donor sheet" is the name given to the surface containing the image that will be transferred to the transfer sheet.

"Transfer sheet" is the sheet of material which acts as a carrier of the image from the donor sheet to the acceptor surface.

SUMMARY OF THE INVENTION

The invention provides a means of transferring an image to an acceptor surface using a transfer sheet comprising the steps of: (1) applying an image-bearing transfer sheet composed of a woven material having a clear thermoplastic adhesive layer on one side to an acceptor surface to received the image; (2) applying pressure and heat to cause the image to transfer from the image from the transfer sheet to the acceptor surface to form a transfer sheet/acceptor surface composite; and (3) removing the transfer sheet from the acceptor surface to leave an image on the acceptor surface. In a preferred embodiment the image is applied to the transfer sheet by (a) preparing a donor sheet by applying an image to a paper having a release-facilitating coating; (b) applying the adhesive-bearing surface of the transfer sheet to the image-bearing surface of the donor sheet to form a donor/transfer sheet composite; (c) heating the backing of the transfer sheet of the composite, thereby transferring the image to the adhesive layer of the transfer sheet; (d) placing the donor/transfer sheet in water and removing the donor sheet from the transfer sheet; (e) applying the adhesive, image-bearing side of the transfer sheet to the acceptor surface and applying heat and/or pressure to the backing of the transfer sheet; and (f) removing the transfer sheet from the acceptor surface.

DETAILED DESCRIPTION OF THE INVENTION

The instant invention provides a process by which a high quality image may be obtained on any material, including, for example, fabric, paper, including poster board, wood, cork, styrofoam, metal, paper, and tempered glass. The image is of such quality that the objects may be used as works of art. For example, any image may be transferred to paper by copier, then colored with color pencils or crayons and the colored image may then be place on fabric. While the images may be transferred to any fabric, results of transfer to silk, rayon, and polymeric synthetics are excellent. As would be obvious to one of ordinary skill in the prior art, the previously described processes which transfer a heavy layer of the material adherent to the image would not provide final products of high quality on such fabrics.

Figure 1:
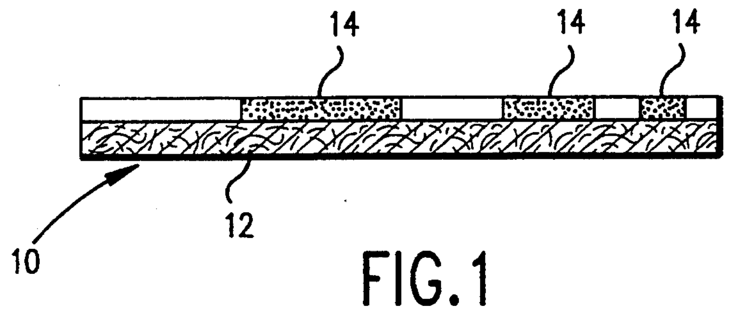
FIG. 1 depicts the donor sheet from which the image will be transferred to the final product.
Figure 2:
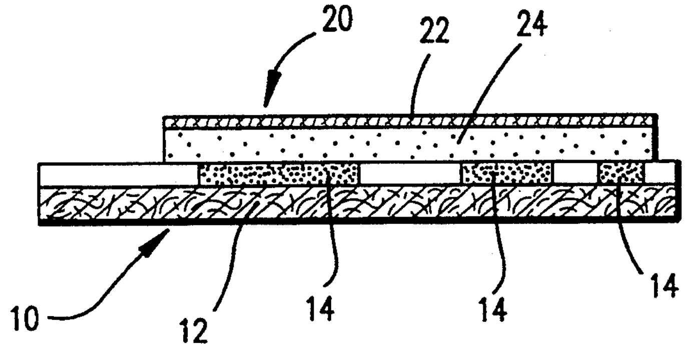
FIG. 2 depicts a composite comprising the transfer sheet and the donor sheet as it is arranged for transfer to the transfer sheet.
Figure 3:
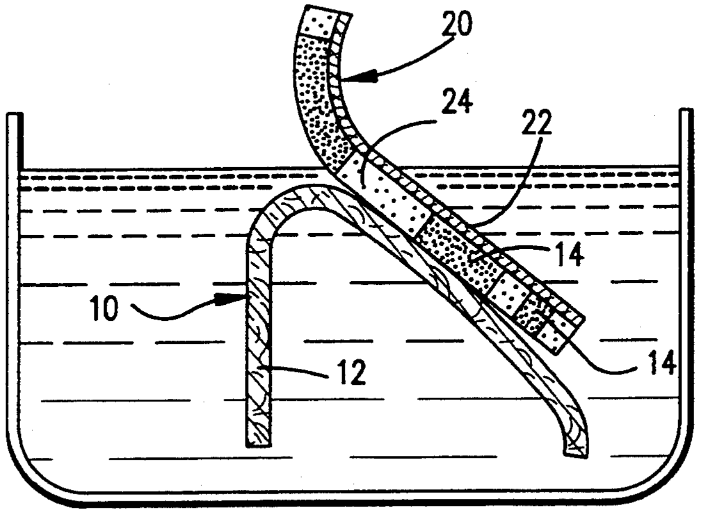
FIG. 3 depicts the composite in water with the paper from the donor sheet being released.
Figure 4:
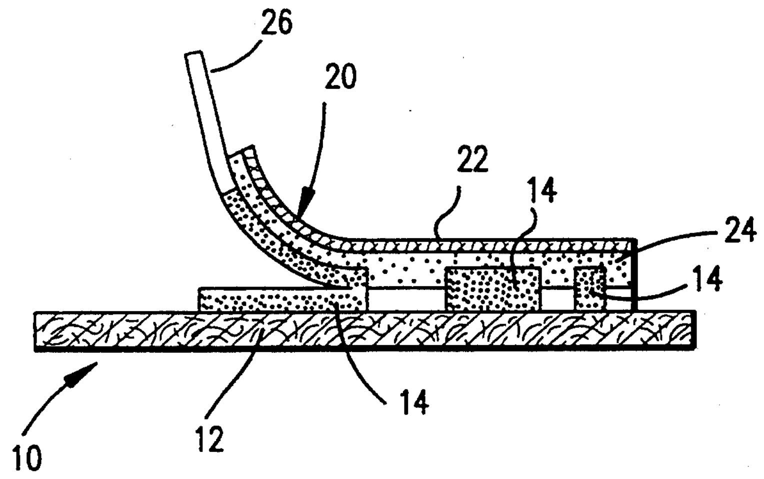
FIG. 4 depicts the removal of the transfer sheet from the donor sheet under dry conditions.
Figure 5:
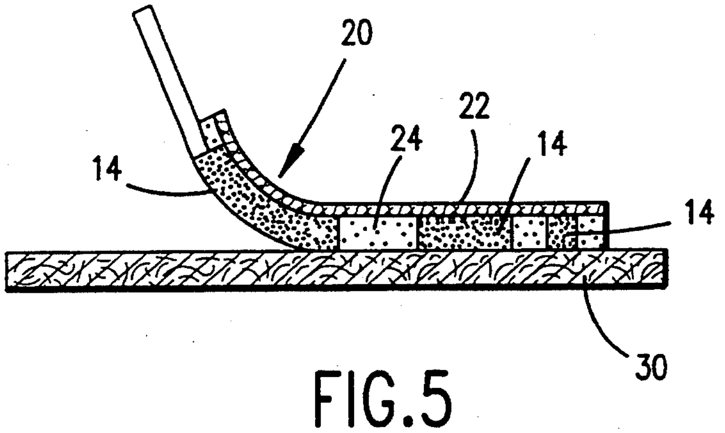
FIG. 5 depicts the placement of the transfer sheet over the acceptor surface for transfer.
Figure 6:
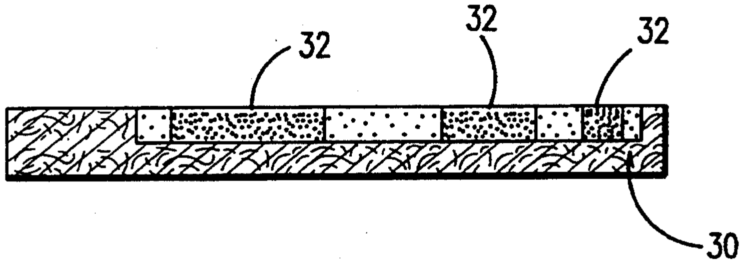
FIG. 6 depicts the acceptor surface with the image applied thereto.

Referring to the drawings, FIG. 1 depicts a donor sheet (10) having an image to be transferred comprising a sheet of paper (12) with design produced by an image-producing, non-absorbed material attached thereto (14) which provides the image. FIG. 2 depicts a transfer sheet (20) comprising a backing material (22) and an adhesive layer (24) wherein the adhesive layer of the transfer sheet is interfaced with the image to be transferred FIG. 3 shows the composite formed by the donor sheet (10) and the transfer sheet in water. The image-producing, non-absorbed material (14) has now been transferred to the adhesive layer (24) and the paper of the donor sheet (12) is being released. FIG. 4 shows the donor sheet and the transfer sheet being separated while dry. FIG. 5 shows the transfer sheet (1) with the image (14) imbedded in the adhesive (24) being applied to the acceptor material (30) for transfer of the image. FIG. 6 shows the acceptor material with the transferred image (32).

The images are transferred using fabric containing an adhesive layer such as modified vinyl chloride acetate copolymer, as disclosed in U.S. Pat. No. 2,631,947, which is incorporated herein by reference in its entirety as though fully reproduced herein.

When the image is transferred to a non-porus material such as stone or glass, the image may be washed off. Images on such materials can be protected with sprays, such as those available in decorating centers.

By the processes of the invention can be used to transfer any image made with a material that will "sit" on top of the surface. Hence, children's art, including work done with color crayons, may be transferred to fabric. The process of the invention can also be used to transfer images made with, for example, chalk, acrylics, lead or color pencils, etc.

Kits containing components for use in the processes of the invention may be prepared for use with any transfer materials. Fabric that has been made by the processes of the invention can be sewed, washed, and dried without releasing the image transferred thereto. However, if the article is to be ironed, the image should be covered with paper to protect the adherent image.

The articles made by the methods of the invention may be used as, for example, wall hangings, pillows, quilts, handbags, dolls, potholders, articles of clothing, place mats and other table coverings and napkins. The rigid materials decorated by the methods of the invention can be used as trophies, jewel boxes, turrets, inserts in furniture, etc.

Properties sought in a transfer sheet are (1) a strong, closely woven fabric with (2) a thin, thermoplastic adhesive layer that is clear and, to the extent it transfers, provides a very clean film.

The present invention can be practiced using a variety of commercially available products usually sold for use as iron-on patches. Such fabrics are commonly used to repair damaged fabrics. The iron-on materials for use on light to medium weight materials are the most appropriate for use by the methods of the invention. The patent cited previously, U.S. Pat. No. 2,631,947 to Kline provides one means of making such a material. The adhesive layer in such materials usually softens to allow attachment of the image to the acceptor layer at about 300–400° F.

The image for transfer to the adhesive layer may be placed over or under the adhesive layer, with heat applied thereto. However, in a preferred embodiment, the image is laid face-up on the ironing board, then the adhesive surface of the transfer sheet is applied thereover. Heat is then applied to the backing fabric of the transfer sheet.

It has been found that a preferred method is to apply the image to a paper having a coating which provides ready release of the image. One such coating is starch. Such papers are often sold as erasable papers. Papers that are super calendered can also be used to advantage in the methods of the invention.

EXAMPLE 1

(a) Preparation of the image-bearing transfer sheet:

A donor sheet was made by photocopying a photograph using erasable bond paper to accept the image. The bond paper bearing the image was then placed on an ironing board with the image exposed and the adhesive surface of a piece of mending fabric (used as the transfer sheet) with an adhesive layer (manufacturer: Coats and Clark) was applied to the image. A heated iron set at cotton reading was then applied to the fabric for 30 seconds. The donor/transfer sheet composite was allowed to cool. The composite was then placed in water. After the composite had been in the water about two minutes, it was possible to peel the paper in a nearly-intact sheet from the image-bearing adhesive surface. The image was then soaped with drops of liquid detergent, rubbed in the palms of the hands, and rinsed to remove any possible invisible paper fibers.

(b) Application of the image to the acceptor surface.

The wet image-bearing adhesive surface was then applied to a finely-woven polyester fabric. A piece of paper was placed over the transfer layer to prevent scorching, and an iron set at the cotton reading was applied for about 30 seconds, after which it was possible to remove the hot, loosened backing from the acceptor fabric in one continuous movement. The image with a thin, transparent layer of adhesive is now attached to the acceptor fabric, which is allowed to cool before further manipulation of the acceptor fabric.

EXAMPLE 2

(a) Preparation of the image-bearing transfer sheet:

A donor sheet was made of a drawing using regular photocopy paper in a copier. The drawing was then colored with color crayons. The donor sheet was then exposed to the transfer sheet and the image was transferred by heating 20 seconds at the "wool" setting. The transfer sheet was peeled dry from the donor sheet when the donor/transfer composite had cooled.

(b) Application of the image to the acceptor surface.

The image bearing adhesive surface was then dipped in water and applied to a cotton broadcloth. A piece of paper was placed over the transfer layer to prevent scorching, and an iron set at the cotton reading was applied for about 60 seconds, after which it was possible to remove the hot, loosened backing from the acceptor fabric in one continuous movement. The image with a thin, transparent layer of adhesive is now attached to the acceptor fabric, which was allowed to cool before further manipulation of the acceptor fabric.

EXAMPLE 3

A transfer sheet was prepared in accord with the method of Example 1. When dry, the transfer sheet was positioned over the wood acceptor surface in the manner described in Example 1. An iron was heated to the "cotton" marking and the iron was placed over the transfer sheet backing with pressure applied until an edge of the transfer sheet could be easily removed from the wood. (The time required for removal from a rigid material will vary, and an edge of the transfer sheet that does not have any image for transfer can be peeled back as a test to determine whether the amount of heat has been sufficient to loosen the adhesive and allow ready removal of the backing of the transfer sheet.)

**Note: For the dry-peeling method described in Example 2, whenever a copier is used for the first time, testing of the process is necessary. Copies made by copying onto a donor sheet should be transferred to sample strips of the transfer material and peeling of the donor sheet from the composite should be done when the sample is hot, after cooling the composite to warm, and after the composite has cooled to determine which temperature is best with donor sheets made on the particular copier. It was discovered that the adhesive would transfer less toner from the donor sheet peeling while hot than when peeled cool from copies made on some copiers. The heat was applied to the transfer sheet/donor sheet composite at the "wool" setting for 20 seconds, the adhesive, when cooled, carried most of the toner and the donor sheet was less likely to tear in some instances. For example, the new Kodak 235 was simpler to use for the dry-peeling method of Example 2, while the Canon PC copiers and many newer copiers provide best copies when the donor/transfer composite is heated briefly and peeled quickly while hot. No tests of the copier are needed for the wet-peeling method.

EXAMPLE 4

(a) Preparation of the transfer sheet:

A donor sheet was made by drawing and coloring with color pencils on erasable paper. The donor sheet was then exposed to the transfer sheet in the method disclosed in Example 1. The transfer sheet/donor sheet composite was then allowed to cool. The transfer sheet was then peeled carefully, while wet, from the donor sheet.

(b) Transfer of the image:

The image was transferred to linen for making of place mats in the manner described in Example 1.

EXAMPLE 5

A donor and transfer sheets were made by the method of Example 1. The image was then transferred to silk charmeuse by the method described therein. After the image had been transferred to silk, the image was colored using colored pencils. The iron was heated to the "cotton" setting. The silk was covered with a 20 pound erasable bond paper and the iron pre-heated at the "wool" setting was applied over the paper for 30 seconds. (When silk is ironed, it is sometimes wise to try the process one intends to use on the image-bearing material on a scrap of the acceptor material. If the silk is damaged, a setting of "wool" should be used in "setting" the image.)

EXAMPLE 6

A transfer sheet was prepared in accord with the teaching of Example 2. The transfer sheet was applied to an acceptor surface of tempered glass. An iron was heated to silk setting. A heavy paper was placed over the transfer sheet and the iron was applied with pressure over the heavy paper for about 15 seconds.

EXAMPLE 7

A donor sheet was made in accord with the teachings of Example 2. The image was then transferred to a fine styrofoam surface (such as the type used in produce trays) using lowest heat setting at 10 seconds. It is possible to transfer the image with minimal heat.

Clay-coated papers such as those used in many quality publications can also be used as the donor sheet for products made by methods of the invention.

EXAMPLE 8

(a) Preparation of the transfer sheet:

A picture printed on clay-coated paper was cut from a magazine for use as a donor. The adhesive surface of the transfer sheet was applied directly to the picture and transferred using the heated iron sent at cotton temperature for 30 seconds. The donor/transfer sheet composite was then placed in very warm water (about 120°-150° F.) until the paper could be peeled away from the adhesive. Fibers of paper remaining are then rubbed off from the adhesive gently.

The transfer sheet can be used in the manner disclosed above for application to the acceptor surface.

EXAMPLE 9

A donor sheet was made in the manner of Example 1 using a faded photograph. The photograph was transferred to the donor sheet using the photocopier on a dark setting. The donor/transfer sheet composite was made using a wide sheet of mending tape ($8.5\times11$ inches).

Because the sheet was wider than the iron, a household ironing press (Elnapress from elna, Inc.) was used to transfer the image to a finely woven cotton/polyester fabric for use as a wall hanging.

EXAMPLE 10

A donor sheet of a photograph was made by the method of Example 1 using a $8\times10$ photograph as the image and transferring the image by photocopy onto an $8.5\times11$ sheet of paper and for the transfer sheet, a $8.25\times10.25$ sheet of mending fabric with the adhesive layer. After the paper was removed, and while the transfer sheet was wet, the adhesive surface was laid against a plate that had been brushed with glycerine. The image was transferred to an acceptor surface of finely woven cotton using a household iron. The operator ironed a strip the width of the iron until the backing was loosed, the peeled the strip before proceeding to iron and peel the next strip. The resulting image was fully as clear as that made with a press as taught in Example 9. (Glycerine is used to facilitate the removal of the transfer sheet from the acceptor surface during transfer of the image. Other agents that facilitate removal of the transfer sheet, ie., that loosen adhesive or impede tight bonding such as ammonia, urea, or salts may also be used.)

EXAMPLE 11

The image was transferred to the transfer sheet from the donor sheet in the method disclosed in Example 1. The transfer sheet was then applied to an unglazed ceramic surface and ironed with the tip of the iron until the transfer sheet could be easily removed.

The image transfer method of the invention works best when the material is woven or porous. Pottery can be glazed after the image has been transferred.

EXAMPLE 12

The transfer sheet was made as in Example 2 and the image was transferred to curved wood buttons using the tip of an iron.

It has been discovered that unfinished wood is more receptive to the image transfer process. A clear finish may be applied after the image transfer process is completed. If the wood is to be painted before transfer, a preferred base for the image is flat paint. The image is then transferred. Thereafter an application of a clear finish to the entire piece may be appropriate.

EXAMPLE 13

A crayon drawing was made on a sheet of Hammermill Laser Plus paper. The transfer sheet was laid over the drawing to provide the donor/transfer sheet composite. The heat was applied at "wool: setting for 15 second. After the donor/transfer sheet composite had cooled, the transfer sheet was removed by dry peeling. The transfer sheet was then laid on a piece of cotton fabric and transferred thereto by the method of Example 2.

EXAMPLE 14

A image which is the face of a child is transferred to the transfer sheet by the method of Example 1. The image is then transferred to a piece of knit fabric tubing such as that used in bandaging and the knit fabric is stuffed and tied to provide a head for a doll.

EXAMPLE 15

An image was made as in Example 14, except that the image is transferred to the sole of a sock for use as a puppet.

EXAMPLE 16

In order to make repeating images on silk, a transfer sheet was made by the method of Example 1. The transfer sheet was allowed to dry. (A wet transfer sheet releases the image fast, so it would be likely that the entire image would be transferred early.) After the transfer sheet has dried, the iron was heated to "cotton". The silk was pre-heated by ironing. The transfer sheet was placed on the hot acceptor silk surface in the usual manner. The iron was run across the transfer sheet twice quickly, and transfer sheet quickly removed. A second piece of silk was heated and process repeated, placing the transfer sheet on the silk, then moving the iron quickly across the transfer sheet. This method has several advantages: The amount of adhesive transferred by this method is negligible, and several copies of the same material can be made. (In some instances, the tip of the iron was used.)

EXAMPLE 17

Five repeated prints were made on drawing paper by the method of Example 16.

EXAMPLE 18

A photograph was printed on artist's canvas by the method of Example 16 and was painted with oils. (While other methods may be used, the quick method of claim 16 wherein little adhesive is transferred is particularly preferred where oils or water colors are to be used after the transfer to the acceptor surface.)

It is possible, by the method of the invention, to combine two or more original images to make a new composite image,

EXAMPLE 19

A portrait of a woman and a larger line drawing of a rose were transferred to two separate transfer sheets by the method of Example 1. The woman's face was cut out of the transfer sheet and fastened, image side down, to cotton batiste. The transfer sheet bearing the image of the rose was positioned on top of the cutout backing. A hot iron transferred both images to the fabric at the same time. When the hot, loosened backing was peeled away, the woman's face was clearly printed at the center of the rose.

EXAMPLE 20

The images in example 19 were transferred to separate transfer sheets by the method of Example 1, and the woman's face cut out as described. The image of the face was fully transferred to the fabric and the backing peeled away. The rose was transferred onto the acceptor fabric over the print of the woman's face. The face appeared to be veiled by the transparent petals.

To make a mirror image of an image, a photocopy of the adhesive side of the transfer sheet with the image transferred thereto can be made. The image is now reversed, and the photocopy can be used to make a second transfer sheet bearing the mirror image of the image from the first transfer sheet. Interesting designs can be made using mirror images of any given image.

It is possible, with new color photocopying equipment to transfer color photos to acceptor surfaces by the methods of the invention. It is also possible to transfer images from the transfer sheets without heat, wherein the agent of transfer is a solvent.

EXAMPLE 21

A transfer sheet was made by the method of Example 1. The wood acceptor surface was moistened with acetone. The toner-made image was positioned and the transferred by application of pressure and without heat.

EXAMPLE 22

A wedding announcement was transferred to the transfer sheet by the method of Example 1, then dried. The nap of the acetate velveteen was smoothed with an iron that had been heated to the "wool" setting. The transfer sheet was positioned and an iron that had been heated to the "cotton" setting was pushed in the direction of the nap across the backing of the transfer sheet to transmit the image.

Because the thermoplastic adhesive advances into fibers when heated, then retreats when cooled, the transfer sheet was cooled before removal from the printed velvet. By this method it was possible to transfer the image without transfer of the adhesive to the velvet.

When the acceptor material is a fabric that will be washed, it is essential that sufficient heat be applied to break the bonds of the adhesive between the fabric backing on the transfer sheet and the adhesive, thus allowing the adhesive with the image to transfer to the acceptor surface. When the material to which the image is applied is rigid, such as glass, the amount of heat required is far less, since the pressure applied to remove the transfer sheet backing is sufficient to break the bonds. Moreover, if the amount of heat applied to glass is too great the glass will break. Materials applied to non-porous surfaces can be rubbed off with pressure and solvents.

The methods of the invention can utilize any form of donor so long as the imaging medium is heat releasable. Hence, newsprint and prints made with some water colors and toners can be used to imprint the donor sheet. The sheet may be made of any material from which the image can be released to the transfer sheet. For example, a piece of formica with a chalk drawings can act as a donor sheet.

It should be remembered that the transfer sheet will carry the reverse image from the donor sheet. Upon transfer to the acceptor surface, the image will be oriented in the same orientation as seen on the donor sheet.

Children as young as 5 or 6 can practice the invention making T-shirts. Drawings and coloring on paper can be transferred by the methods of the invention to make place mats and other decorative items for relatives. Items such as hand bags, canvas hats, etc. are especially appropriate for decoration by the methods of the invention.

Because it is possible to make excellent images using old photographs photocopied on to the donor sheet, it is possible to make "generational" wall hangings, quilts, etc.

Because the decorative fabrics produced by the method of the invention remain supple, it is possible to further decorate the fabrics using stitchery, lace, braid, or other decorative means.

The materials needed for practice of the invention can readily be provided as kits. Such kits may contain the closely woven backing with the adhesive for use in making the transfer sheet, donor sheets (blank or having images made with heat-releasable material such as toner), other art supplies such as coloring pencils, and acceptor materials such as wood or fabric. Of course, the kits may contain only the transfer sheets for imprinting with the desired image and instructions for use with various transfer and acceptor materials. Kits may also contain vessels of releasing agents (releasing facilitators) such as glycerine or salt solutions.

The wet process of Example 1 works particularly well with knits. The transfer sheet should, in those instances, be used while wet after the peeling of the donor sheet from the transfer adhesive surface.

When it is desirable to color the image, color pencils may be used to add the color at any of several stages in the operation. The image on the donor sheet, on the dried adhesive of the transfer sheet with the image, or on the acceptor surface may be colored. If the color is added to the image on the acceptor surface, a sheet of paper should be placed over the colored image and heat should be applied for about 30 seconds to "set" the color.

Color may be added by coloring on the image on the adhesive of the dry transfer sheet. The colored transfer sheet can be dipped in water before transfer to the acceptor surface. This works quite well to make knit shirts. It is also possible to provide children with transfer sheets, allow them to actually draw on the adhesive side of such sheets, then transfer the drawings to acceptor surfaces such as shirts, socks, etc.

I claim:

1. A kit containing, at least one transfer sheet of a finely-woven material with an thin film of transparent, heat sensitive adhesive attached thereto and instructions for transferring an image from a donor sheet to the transfer sheet and from the transfer sheet to an acceptor surface using said transfer sheet.

2. A kit of claim 1 containing, additionally, an acceptor surface.

3. A kit of claim 2 wherein the acceptor surface is a fabric.

4. A kit of claim 1 which contains, additionally, donor sheets carrying an image wherein the image is made with heat-releasing material.

5. A kit of claim 2 containing, additionally, coloring pencils.

6. A kit of claim 1 containing, additionally, a vessel of releasing facilitator.

7. A kit of claim 4 containing additionally, a vessel of a releasing facilitator.

8. A kit of claim 7 containing, additionally, coloring pencils.

9. A kit of claim 1 containing, additionally, blank donor sheets.

10. A kit of claim 9 containing, additionally, a vessel of releasing facilitator.

* * * * *